United States Patent
Saiz

(10) Patent No.: US 11,162,617 B2
(45) Date of Patent: Nov. 2, 2021

(54) RETRACTABLE HOSE BASED ON A DUAL-MATERIAL TEXTILE

(71) Applicant: Serge Ferrari SAS, Saint Jean de Soudain (FR)

(72) Inventor: Carlos Saiz, Challes les Eaux (FR)

(73) Assignee: Serge Ferrari SAS, Saint Jean de Soudain (FR)

( * ) Notice: Subject to any disclaimer, the term of this patent is extended or adjusted under 35 U.S.C. 154(b) by 0 days.

(21) Appl. No.: 16/635,084

(22) PCT Filed: Jul. 29, 2018

(86) PCT No.: PCT/FR2018/051952
§ 371 (c)(1),
(2) Date: Jan. 29, 2020

(87) PCT Pub. No.: WO2019/030444
PCT Pub. Date: Feb. 14, 2019

(65) Prior Publication Data
US 2021/0095795 A1    Apr. 1, 2021

(30) Foreign Application Priority Data
Aug. 7, 2017 (FR) ...................................... 1757562

(51) Int. Cl.
*F16L 11/02* (2006.01)
*F16L 11/24* (2006.01)

(52) U.S. Cl.
CPC .............. *F16L 11/02* (2013.01); *F16L 11/24* (2013.01)

(58) Field of Classification Search
CPC .................................. F16L 11/02; F16L 11/24
USPC ......................... 138/124, 129, 134, 111, 113
See application file for complete search history.

(56) References Cited

U.S. PATENT DOCUMENTS

| | | | |
|---|---|---|---|
| 2,874,722 A | 2/1959 | Hamblin | |
| 3,554,237 A * | 1/1971 | Pelley | F16L 59/027 138/122 |
| 3,706,326 A * | 12/1972 | Bringolf | F16L 11/24 138/129 |
| 4,025,684 A * | 5/1977 | Neidhardt | A47C 27/081 442/206 |

(Continued)

FOREIGN PATENT DOCUMENTS

| | | |
|---|---|---|
| EP | 0814291 A1 | 12/1997 |
| FR | 1423500 A | 1/1966 |

OTHER PUBLICATIONS

International Search Report issued in PCT Patent Application No. PCT/FR2018/051952 dated Nov. 6, 2018.

*Primary Examiner* — Craig M Schneider
*Assistant Examiner* — David R Deal
(74) *Attorney, Agent, or Firm* — Marshall, Gerstein & Borun LLP

(57) ABSTRACT

The invention relates to a retractable pipe whose wall is formed of at least one flexible gas-impermeable and/or liquid-impermeable tape welded by its selvages in the form of a cylindrical helix and of at least one metal wire in the form of a cylindrical helix whose pitch is the same as the one formed by said band, characterized in that said tape is a double fabric textile comprising at least two regions where the two fabrics work together to delimit at least one inflatable zone, said textile being covered with a coating layer of a gas and/or liquid-impermeable material.

19 Claims, 2 Drawing Sheets

(56) References Cited

U.S. PATENT DOCUMENTS

| | | | | |
|---|---|---|---|---|
| 4,423,283 | A * | 12/1983 | Weismann | F16L 11/081 |
| | | | | 138/111 |
| 6,199,676 | B1 * | 3/2001 | Targiroff | B64D 25/14 |
| | | | | 156/322 |
| 7,766,050 | B2 * | 8/2010 | Patel | B29C 65/5057 |
| | | | | 138/129 |
| 7,946,311 | B2 * | 5/2011 | Kolzumi | F16L 11/125 |
| | | | | 138/124 |
| 9,523,512 | B2 * | 12/2016 | Carlay, II | F24F 13/0263 |
| 9,599,256 | B2 * | 3/2017 | Konno | F16L 11/127 |
| 10,751,498 | B2 * | 8/2020 | Munkelt | A61M 16/16 |
| 2006/0199501 | A1 * | 9/2006 | Cassidy | F24F 13/0254 |
| | | | | 454/228 |
| 2014/0261701 | A1 * | 9/2014 | Deutsch | F24F 13/0272 |
| | | | | 137/1 |
| 2017/0159965 | A1 * | 6/2017 | Pinkalla | F24F 13/0254 |

\* cited by examiner

RETRACTABLE HOSE BASED ON A DUAL-MATERIAL TEXTILE

FIELD OF THE INVENTION

The present disclosure relates to the flexible pipe industry. In particular, the present disclosure relates to a retractable pipe.

Retractable pipe shall mean a pipe whose length can be adjusted to minimize its volume when not in use, or more specifically to adjust its service length.

BACKGROUND

Retractable pipes are particularly advantageous compared to rigid pipes because their storage and transport require a much less volume. Furthermore, the length of a retractable pipe can be easily adjusted according to its site of use by a simple positioning, unlike a conventional pipe, which must be cut to its exact useful length.

Retractable pipes used in ventilation or air conditioning pipes are known. These pipes are generally composed of a flexible PVC tape welded by its selvages into the form of a cylindrical helix and of a metal wire also in the form of a cylindrical helix and having the same pitch.

However, these pipes have a limited mechanical resistance, which does not allow their use in applications where the pipes are subjected to high stresses and repeated attacks, such as for example underwater applications. Furthermore, these pipes are intended to be permanently positioned in an installation. These pipes are therefore intended to be adjusted to the required length for their use, depending on the installation in which they are positioned, but are not intended to be repeatedly lengthened and retracted.

Therefore, there is a need to obtain a retractable pipe, having sufficient mechanical strength, which can be repeatedly lengthened and retracted.

SUMMARY OF THE DISCLOSURE

In order to meet this need, the Applicant has developed a retractable pipe based on a double fabric textile. In particular, the double fabric textile is coated and has inflatable zones.

The disclosure relates to a retractable pipe whose wall is formed of at least one flexible gases-impermeable and/or liquid-impermeable tape welded by its selvages in the form of a cylindrical helix and of at least one metal wire in the form of a cylindrical helix whose pitch is the same as the one formed by said tape, characterized in that said tape is a double fabric textile comprising at least two regions where the two fabrics work together to delimit at least one inflatable zone, said textile being covered with a coating layer of a gases and/or liquid-impermeable material.

An advantage of the disclosed embodiments is the obtaining of a retractable pipe having good mechanical resistance thanks to the coated textile.

Another advantage of the disclosed embodiments is the possibility of precisely and repeatedly lengthening or retracting the pipe thanks to the adjustment of the inflation level of said inflatable zones.

The textile forming the tape brings numerous advantages in comparison with the prior art. Firstly, it can be industrially obtained without subsequent assembly because the inflatable areas and the area where the two fabrics work together are made with all the warp threads and weft threads. The sets of warp threads and weft threads are split in the inflatable zones so as to weave two separate fabrics and gather again in the regions where the two fabrics work together so as to weave a single fabric. Therefore, the woven textile has, at the exit of the loom, areas with two fabrics and areas with a single fabric, thus forming a single material.

This particular weaving gives an intrinsic mechanical resistance to pressure by the crossing of the warp threads and weft threads during weaving. This resistance to static pressure and to fatigue bears no comparison with the resistance of membranes obtained by gluing, welding or sewing which delaminate during excessive pressurization.

The wall of the retractable pipe is formed by a gas and/or liquid-impermeable tape and is welded by its selvages in the form of a cylindrical helix. The size of the cylinder and the pitch of the tape helix depend on the desired application. A man skilled in the art understands that a pipe used to pump large volumes of seawater at shallow depth will have dimensions that are fairly different from those of a pipe used to water a garden.

Said tape is a double fabric textile. Double fabric textile shall mean a fabric whose warp and weft threads are in certain areas of the textile, separated into sub-assemblies, which are woven independently to form two fabrics, which are connected by the areas where all the threads work together.

The double-fabric textile thus comprises at least two regions where the two fabrics work together to delimit between themselves at least one inflatable zone.

The region where the two fabrics work together is understood to be a region where all the weft threads and all the warp threads work together, in opposition to the inflatable zones where the warp and weft threads are separated into independently woven sub-assemblies.

Thus, in the regions where the two fabrics work together, all the weft threads and all the warp threads work together. In other words, in regions where the two fabrics work together, only one fabric is apparent.

In contrast, the inflatable zones have two separate fabrics, because a first part of the weft threads works with a first part of the warp threads and a second part of the weft threads works with a second part of the warp threads.

Thus, in the inflatable zones, two disjoint fabrics can be observed and in the regions where the two fabrics work together, a single fabric can be observed.

Inflatable zone shall mean a zone where a fluid, which may be a gas or a liquid, can be introduced and confined.

The double fabric textile forming the pipe wall must have mechanical resistance as well as a good flexibility. Indeed, the pipe must resist the pressure difference, which can appear between the inside and the outside of the pipe. Thus, the pipe should not collapse on itself when the internal pressure of the pipe is lower than the external pressure, when the pipe is used to draw in a fluid. In addition, it must not break apart when the pipe is used as an outlet of a pumping installation. This resistance of the pipe must combine itself with great textile flexibility, allowing the pipe to be stored and compacted in its length when the inflatable zones are emptied.

Thus, when the double fabric textile is not inflated, the pipe can be brought together axially by counteracting the spring effect of the metal wire, and consequently, the size of the pipe is minimized when it is not used.

In the case where the pipe is inflated from a fully deployed position, the two fabrics from the inflatable zones deviate from the median plane of the wall, the distance between two zones where the fabrics successively work together is reduced. In fact, the inflation causes the inflatable zones deformation, which induces a deformation of the pipe wall. Thus, from a fully deployed and non-inflated pipe, inflation causes the length of the pipe to decrease. Therefore, the swelling level of said inflatable zone is directly correlated to the size of the pipe. Thus, the size of the pipe can be adjusted to the length necessary for its use according to its swelling level.

In a specific embodiment, the wall of the retractable pipe is formed of two bands. For a retractable pipe of the same minimum and maximum length, the internal and external diameter will be greater when two tapes form the wall. Indeed, in the case of the use of two bands, the inflatable zones are smaller and the size of these inflatable zones inside the pipe is smaller. Thus, at the same fluid circulation speed, the section reduction due to the inflation of the inflatable zones is smaller than in constructions with a single band, and a greater fluid flow can be achieved. In other words, the use of a retractable pipe whose wall is formed of two tapes makes it possible to get, for the same speed, a greater flow of fluid than in a retractable pipe formed of a single band. Of course, the contemplated embodiments also cover the variants where the pipe is developed with a number of similar tapes greater than two, with an advantage residing in the increased internal diameter and therefore a reduction in pressure losses favourable to the energy balance of an installation that uses the pipe.

The double fabric textile is covered with a gas and/or liquids-impermeable coating on its external faces. It is important that the coating layer is not deformed under any pressure stress. In other words, it is important that the coated fabric is inextensible and non-elastic. However, the textile must have a certain flexibility in order to be able to be inflated without damaging the coating layer.

Thus, advantageously, the coating layer has a thickness between 50 µm and 400 µm, preferably between 100 µm and 200 µm.

In order to maximize the tightness of the double fabric textile, it is necessary to minimize the weft threads shrinkage. Advantageously, the double fabric textile has a weft shrinkage of less than or equal to 1%.

The coating layer is based on a polymer chosen from the group comprising polyvinyl chloride (PVC), polyurethane, and in general all coatable thermoplastics and silicone.

The wall includes at least one metal wire. The metal wire is also in the form of a cylindrical helix. The size of the cylinder and the pitch of the metal wire helix are identical to those of the tape cylindrical helix. The metal wire maintains the pipe to a cylindrical shape when the pipe is not inflated. It allows minimizing the mechanical stresses undergone by the double fabric textile. Furthermore, the cylindrical helix shape of the metal wire must adapt to the cylindrical helix shape of the double-fabric textile during inflation and deflation of the textile.

Thus, it is better if the metal wire has a good mechanical resistance but also a flexibility allowing its deformation during inflation and deflation of the textile. Advantageously, said metal wire is made of steel, advantageously of stainless steel in case of a use in aqueous environment, in particular a marine environment.

The metal wire can be incorporated into the wall of the retractable pipe in different ways. Preferably, the metal wire is positioned between two weld lines to be kept in contact with said band.

In a preferred embodiment, the metal wire is positioned between two selvedges of said strip welded to each other. In practice, the metal wire is positioned on a first selvedge of said textile, then the selvedge facing said first selvedge is positioned above said metal wire, the two selvedges protruding on each side of the metal wire. The two selvedges are then welded, which traps said metal wire between themselves.

In the case where the wall is formed of two bands, said metal wire is advantageously positioned between a selvedge of one of said tapes and a selvedge of the other of said tapes welded to one another. In practice, the metal wire is positioned on a first selvedge of said textile of one of the two tapes then the selvedge of said textile of the other tape facing said first selvedge is positioned above said metal wire, the two selvedges protruding on each side of the metal wire. The two selvedges are then welded, which traps said metal wire between themselves.

In another preferred embodiment, said metal wire is positioned between one of the area where the two fabrics work together and an additional band, welded to the wall. In practice, the metal wire is positioned on a region where the two fabrics work together, then it is covered by a tape protruding on each side of said wire. The tape is then welded to the wall around said wire to trap said wire between said strip and the wall of the retractable pipe. In this embodiment, said wire can be positioned on the external face or on the internal face of the tube wall. Advantageously, said wire is positioned on the internal face, in this case, said wire remains contained in the tube and the force exerted on said additional tape is smaller than when said wire is positioned on the external face of the wall.

In a preferred embodiment, an elastic film covers the entire wall inside said pipe, said elastic film being welded to said textile around said inflatable zone.

In other words, the internal wall of the pipe is smoothened by an elastic film that can extend and retract simultaneously with the retractable pipe.

This embodiment makes it possible to channel the fluid flow inside the retractable pipe by eliminating the obstacles represented by said inflatable zone when it is inflated. Thus, the flow inside the pipe is more laminar and less turbulent.

In another particular embodiment, an air chamber is positioned in said inflatable zones. The pressure exerted on the wires when the inflatable areas are inflated, damages such as cracks and breaks, can make the fabric porous or even permeable. It is therefore advantageous to use an air chamber, which provides the impermeability necessary to inflate the inflatable zones. Furthermore, through the use of an air chamber, it may be possible to use textiles, which may not be highly impermeable to the fluid filling the inflatable areas.

The retractable pipe is particularly suitable for pumping seawater at different depths according to the needs of the operation.

For example, pumping deep seawater to use as fluid in air conditioning systems is booming. In order to control the temperature of the air conditioning it is necessary to be able to introduce water at different temperatures. The length of the retractable pipe being adjustable in situ, increasing the length of said pipe is enough to decrease the temperature of the air conditioning by pumping cooler water from a greater depth.

Advantageously, the retractable pipe is associated with a filtration device. This embodiment allows, among other things, to filter the fluid before it enters said pipe.

In the case, for example, of fish cages, the water pumped into the sea or the ocean must contain a maximum of nutrients to feed the fishes and keep the jellyfishes out With the pipe associated with a filtration device, it is possible to lengthen or retract the pipe to pump the water at the optimal place with regard to the fishes nutrition, while filtering the water and preventing jellyfish from entering the fish cage.

BRIEF DESCRIPTION OF THE FIGURES

The best mode of carrying out the disclosed embodiments, as well as the benefits resulting from it, will emerge clearly from the description of the following embodiments, with the support of the appended figures in which.

Of course, the dimensions and proportions of the elements illustrated in FIGS. 1 to 6 could have been exaggerated compared to reality, and have been given only in order to facilitate the understanding of the contemplated embodiments.

DETAILED DESCRIPTION

Figure 1:
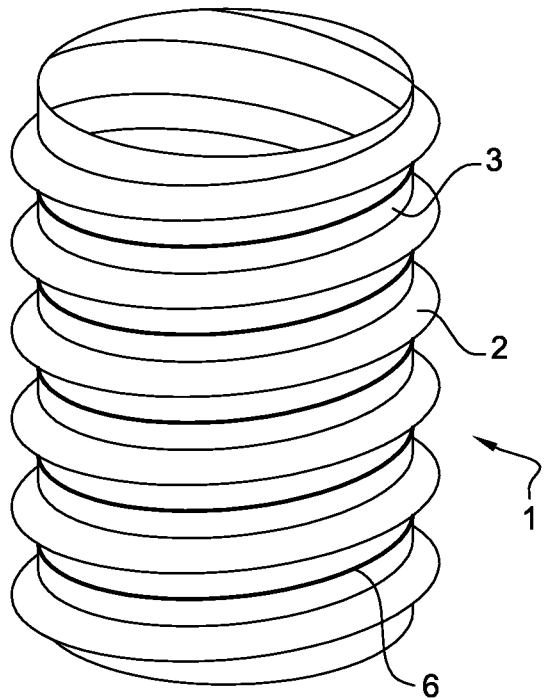
FIG. 1 is a perspective view of a pipe, shown in an inflated configuration.

As illustrated in FIG. 1, the disclosed embodiments relate to a retractable pipe 1, which has a generally cylindrical shape when it is in usage conditions. To do this, the pipe comprises an inflatable zone 2, which extends over the wall of the pipe by forming a cylindrical helix.

In addition, the pipe also includes a metal wire 6, which makes it possible to maintain the pipe in a certain shape, in particular when radial stresses are exerted on the pipe, due to a pressure difference between the internal and external regions of the pipe.

Figure 3A:
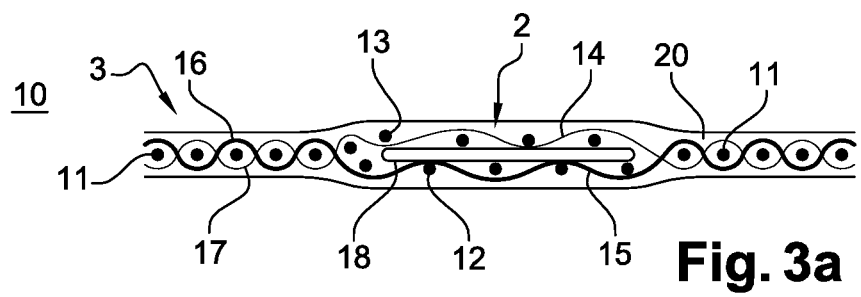
FIGS. 3a and 3b are detailed schematic cross-sectional views of the inflatable area of a tape used to manufacture the pipe of FIG. 1, shown respectively in non-inflated and inflated configurations.

As already mentioned, the pipe 1 is formed by the helical spiral winding of an elementary tape 10, made of a coated textile, as illustrated in FIG. 3a.

As schematically illustrated, this coated textile has an inflatable zone 2 in which the fabric is separated into two distinct fabrics. More specifically, in its lateral area, the textile is made of warp threads 11, which are woven with all of the weft threads 16, 17. The area 3 in which the textile has only one fabric form non-deformable zones of the band, which define the median dimension the pipe diameter.

Figure 3B:
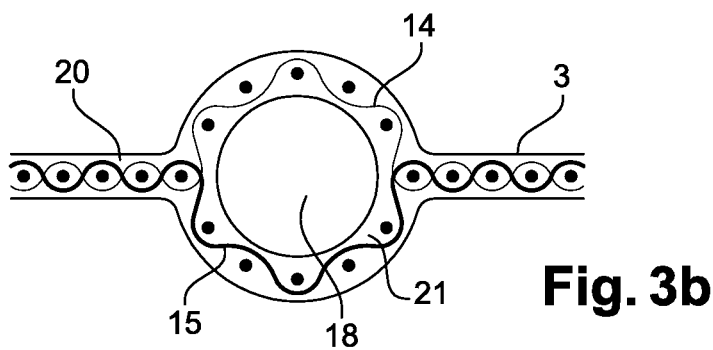
Figure 4:
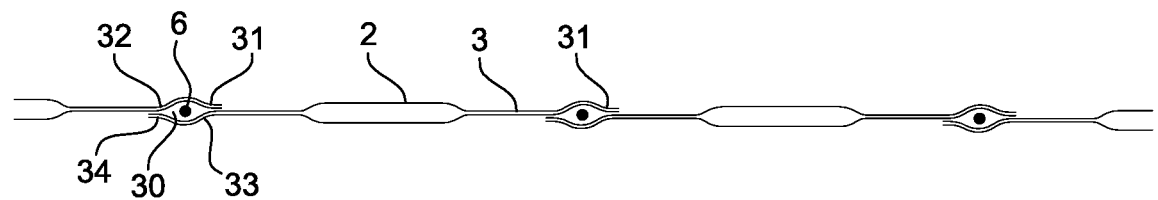
FIGS. 4 and 5 are cross-sectional views showing the assembly of tapes allowing the production of a pipe, for several variants of embedding the reinforcing metal wire.

In its central part, the warp threads are separated into two independent plies, so that a part of the weft threads 14 works with one half of the warp threads 13, while the other ply of weft threads 15 works with the other half of the warp threads 12. In this configuration, the inflatable zone 2 of the tape has two fabrics, between which a space 18 is defined, which, as illustrated in FIG. 3b, can be inflated by a fluid, to adopt a bulged shape, of typically circular, elliptical or similar section.

Because the textile is a coated textile, which has a layer 20 of coating material, it has a tightness against fluids, between the inside and the outside of the pipe, but also between the volume 18 defined in the inflatable zone of the pipe and the outside as well as the inside of the pipe itself.

The inflatable zone 2 being constituted by a continuous structure formed by the warp threads, it has a great resistance to tearing, and even to elongation, which makes it possible to limit the stresses exerted on the coating layer 20 in which the tightness resides.

However, this tightness can also be reinforced in a variant not shown in the figures, by inserting into the inflatable volume 18, a hermetic tabular membrane, such as an air chamber or similar.

Figure 2A:
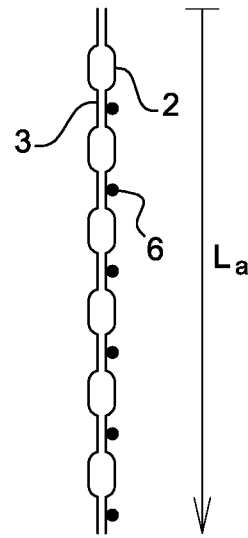
FIGS. 2a and 2b are longitudinal cross-sectional views of the pipe in FIG. 1, showing the pipe in the non-inflated and inflated configurations respectively.
Figure 2B:
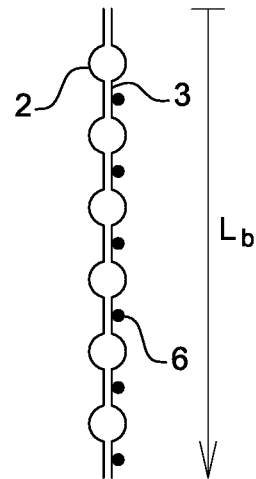

As illustrated in FIG. 2, when the various inflatable zones 2 are deflated, the pipe has an elongated configuration, since the fabrics defining the inflatable area 2 are substantially parallel. On the other hand, when the inflatable area 2 are inflated, as illustrated in FIG. 2b, then these inflatable area adopt a substantially circular shaped section, so that the pipe passes goes from a length Lb to a length Lb. Depending on the respective dimensions of the inflatable area 2 and inextensible area 3, the ratio may be in the order of 1/1.5, i.e. of the order of 65%

As already mentioned, pipe 1 includes a metal wire 6 in order to maintain its shape. In the embodiment illustrated in FIG. 4, this metal wire 6 is also wound in a helix, with a pitch identical to that of tape 10. This wire 6 is secured to the pipe by the welds 32, 33 of the selvedges 30, 31 of consecutive turns of tape 10. These two welds 32, 33, made on either side of the wire 6 thus create a sheath 34 in which the wire 6 is trapped.

Figure 5:
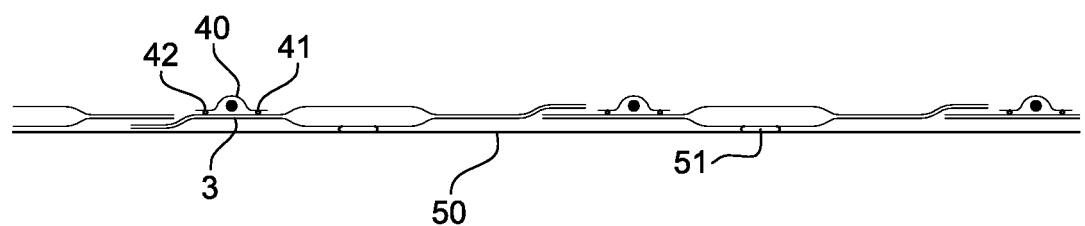

In another variant illustrated in FIG. 5, the metal wire 6 is secured to the tape 10 by adding an additional tape 40 welded by its two selvedges 41, 42 to the planar portion 3 of the band.

Of course, to give more elastic force to the pipe while retaining its flexibility, it is also possible to provide several metal wires wound in a spiral, arranged side by side or preferably in two distinct area of the band, in order to improve the pipe resistance to radial crushing.

In the embodiment illustrated in FIG. 5, the inner wall of the pipe is equipped with an elastic film 50, which is secured to the inner wall of the pipe by the welds 51 made on the inflatable area, at the areas that move away from the cylinder formed by the inextensible zones 3 of the band.

Figure 6:
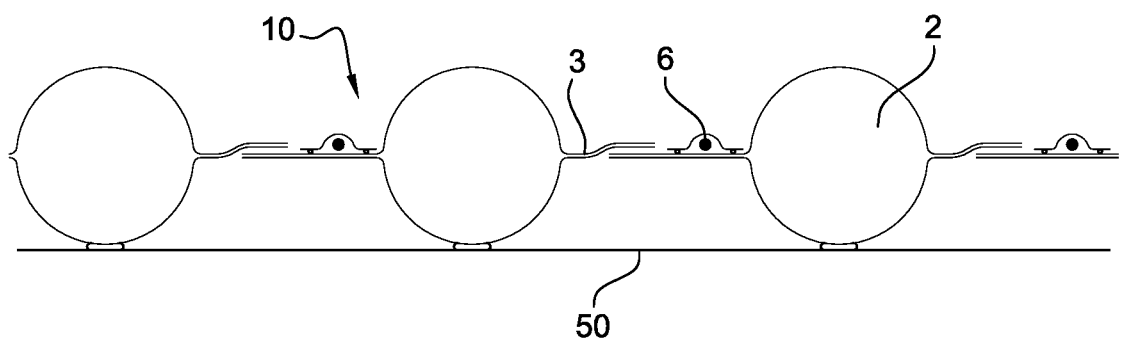
FIG. 6 is a similar view to FIG. 5, in which the inflatable areas are shown inflated.

In this way, as illustrated in FIG. 6, when the inflatable zones 2 are inflated, the elastic film 50 retracts to form on the inside of the pipe, a noticeably cylindrical wall, avoiding the flow disturbance of the fluid by the presence of protuberances formed by the inflatable area.

The invention claimed is:

1. A retractable pipe whose wall is formed of at least one flexible gas impermeable and/or liquid-impermeable tape, selvages of said tape being welded to form a cylindrical helix and of at least one metal wire formed as a cylindrical helix whose pitch is the same as the cylindrical helix formed by said tape, wherein said tape is a double fabric textile comprising at least two regions where two fabrics of the double fabric textile are woven together to delimit at least one inflatable zone, said textile being covered with a coating layer of a gases and/or liquid-impermeable material.

2. The pipe according to claim 1, wherein said metal wire is made of steel.

3. The pipe according to claim 2, wherein the wall is made of at least two tapes.

4. The pipe according to claim 3, wherein said metal wire is positioned between a selvage of one of said tapes and a selvage of the other said tape welded together.

5. The pipe according to claim 2, wherein said metal wire is positioned between two selvages of said tape welded together.

6. The pipe according to claim 2, wherein said metal wire is positioned between one of the regions delimiting the at least one inflatable zone and a tape welded on said wall.

7. The pipe according to claim 2, wherein an elastic film covers entirely a wall inside of said pipe, said elastic film being welded to said textile around said inflatable zone.

8. The pipe according to claim 1, wherein the wall is made of at least two tapes.

9. The pipe according to claim 8, wherein said metal wire is positioned between a selvage of one of said tapes and a selvage of another said tape welded together.

10. The pipe according to claim 9, wherein an elastic film covers entirely a wall inside of said pipe, said elastic film being welded to said textile around said inflatable zone.

11. The pipe according to claim 8, wherein said metal wire is positioned between one of the regions delimiting the at least one inflatable zone and a tape welded on said wall.

12. The pipe according to claim 8, wherein an elastic film covers entirely a wall inside of said pipe, said elastic film being welded to said textile around said inflatable zone.

13. The pipe according to claim 1, wherein said metal wire is positioned between two selvages of said tape welded together.

14. The pipe according to claim 13, wherein an elastic film covers entirely a wall inside of said pipe, said elastic film being welded to said textile around said inflatable zone.

15. The pipe according to claim 1, wherein said metal wire is positioned between one of the regions delimiting the at least one inflatable zone and a tape welded on said wall.

16. The pipe according to claim 15, wherein an elastic film covers entirely a wall inside of said pipe, said elastic film being welded to said textile around said inflatable zone.

17. The pipe according to claim 1, wherein an elastic film covers entirely a wall inside of said pipe, said elastic film being welded to said textile around said inflatable zone.

18. The pipe according to claim 1, wherein an air chamber is positioned inside said inflatable zone.

19. The pipe according to claim 1, wherein the pipe is connected to a filtration device.

\* \* \* \* \*